[19] United States Patent
Platzek

[11] 3,855,789
[45] Dec. 24, 1974

[54] EXPLOSIVE COUPLING ASSEMBLY
[75] Inventor: Harold M. Platzek, China Lake, Calif.
[73] Assignee: The United States of America as represented by the Secretary of the Navy, Washington, D.C.
[22] Filed: Apr. 5, 1968
[21] Appl. No.: 720,438

[52] U.S. Cl.............. 60/225, 60/245, 102/49.5, 239/265.19
[51] Int. Cl............................................ F02k 9/06
[58] Field of Search ............ 60/225, 245; 102/49.5; 239/265.19

[56] References Cited
UNITED STATES PATENTS
3,040,517  6/1962  Ryden et al............................. 60/225
3,063,240  11/1962  Ledwith................................ 60/225
3,122,098  2/1964  Glennan............................. 102/49.5

Primary Examiner—Samuel Feinberg
Attorney, Agent, or Firm—R. S. Sciascia; R. Miller; G. F. Baker

[57] ABSTRACT

Rocket boost-ram jet sustained motor which sequentially employs same combustion chamber, the rocket nozzle with a relatively small throat being ejected at rocket burn out to provide a ram jet nozzle having larger throat, characterized by segmented locks for securing the rocket nozzle to the motor which are released upon command by actuation of explosive bolts.

2 Claims, 2 Drawing Figures

PATENTED DEC 24 1974　　3,855,789

INVENTOR.
HAROLD M. PLATZEK
BY
V. C. MULLER
ROY MILLER
ATTORNEYS.

EXPLOSIVE COUPLING ASSEMBLY

BACKGROUND OF THE INVENTION

In a recent development in jet motors, a motor is launched and accelerated by a rocket propellant to a desired speed at which the propellant becomes expended and the motor is then sustained in speed as a ram jet motor, the same combustion chamber being employed in both modes of operation. This has required exhaust or thrust nozzles of different cross sectional areas due to the difference of pressure, volume and velocity of the exhaust gases while operating under each mode. One manner of attaining this end is to provide a rocket nozzle which telescopes within the ram jet nozzle and is ejected at rocket burn out, providing a larger nozzle for ram jet operation.

DESCRIPTION OF THE PREFERRED EMBODIMENT

Figure 1:
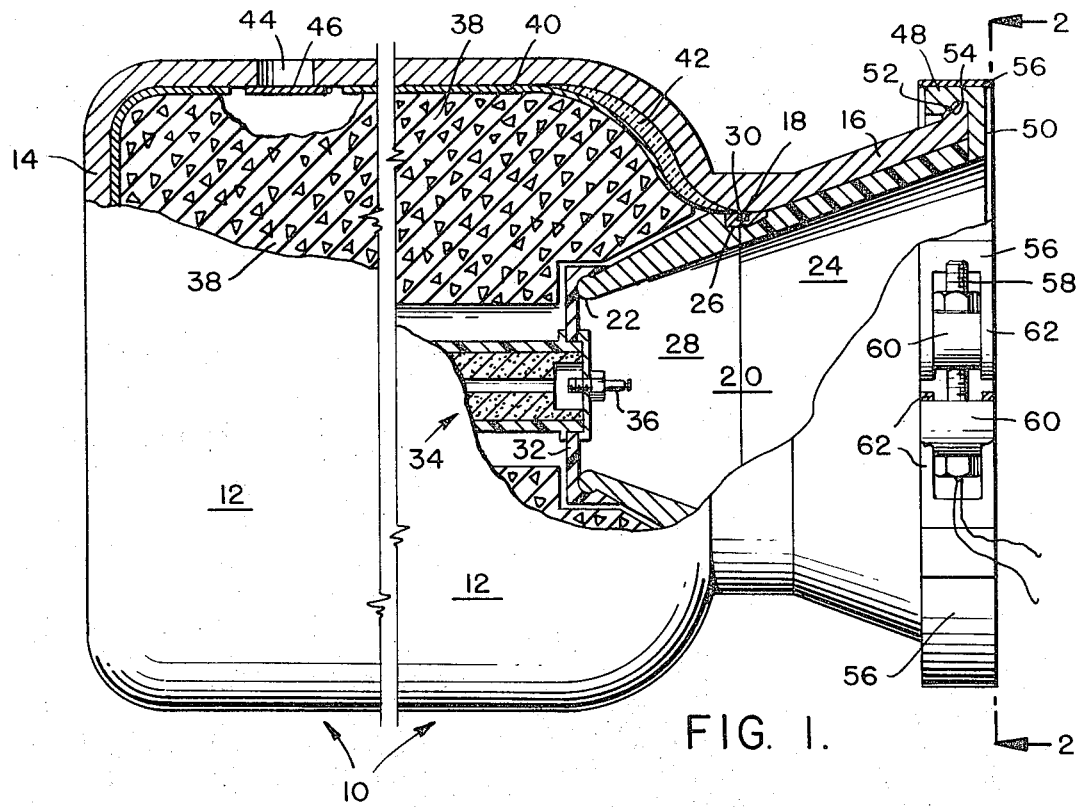
FIG. 1 is a side elevation of a thrust motor, the central portion being omitted and other portions being shown in section.
Figure 2:
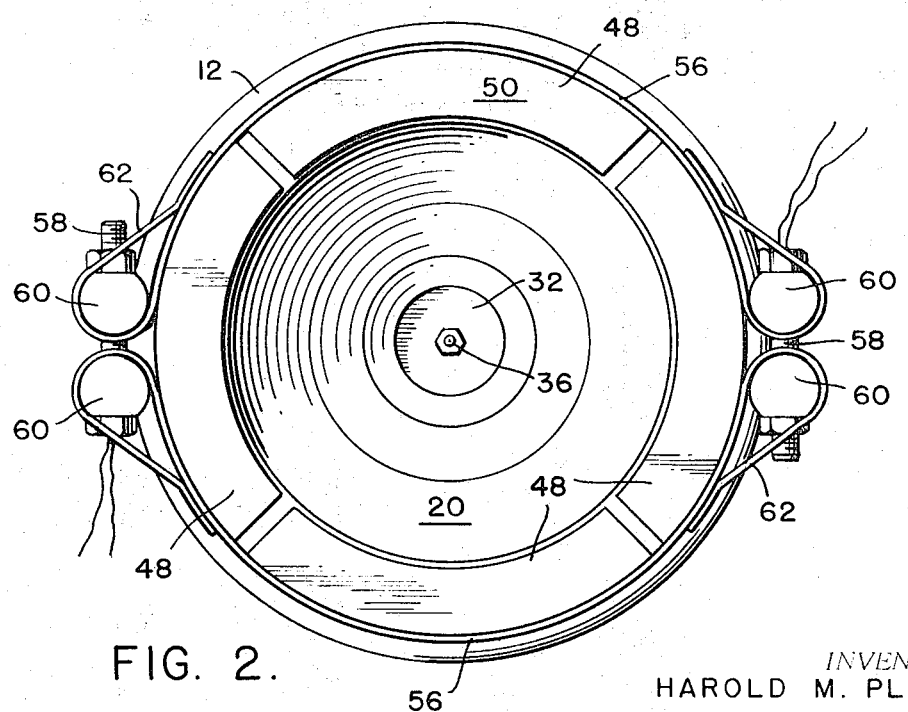
FIG. 2 is a end elevation as viewed from line 2—2, FIG. 1.

Motor 10 comprises a casing 12, closed at its forward end by a wall 14, its rear end being provided with a De Laval ram jet exhaust nozzle 16 having a minimum or throat diameter at the transition point 18 between convergence and divergence. A similar rocket nozzle 20 is telescopically received within the ram jet nozzle which has a throat diameter at transition point 22 which is considerably smaller than the ran jet throat. As illustrated, nozzle 20 is formed with a portion 24 of phenolic material moulded to a steel band 26, and a graphite portion 28 adhesively bonded to the phenolic material and ring. The ring is circumferentially grooved for receiving an O-ring 30 which provides a seal at the ram jet throat.

The inner end of nozzle 20 is closed with a plexiglass disk 32 which supports a consumable rocket grain igniter 34 which is initiated by an electric squib 36. A centrally perforate solid propellant grain 38 substantially fills casing 12. A casing liner 40 and insulation 42 may be provided if desired.

The forward end of the casing is provided with angularly spaced apertures 44, one of which is illustrated, each of which is closed by a suitable hinged valve 46, the apertures communicating with a source (not shown) of ram air.

Nozzle 20 is releasibly secured to the casing by four generally U-shaped arcuate segments 48, each of which is provided with a flange 50 which abuts the rear face of nozzle 20 and a tapered face 52 which abuts a corresponding face 54 on the rear end of the casing. The angle of these faces is so chosen to permit the segments to move radially outward in response to axial rearward movement of nozzle 20. Two bands 56 surround the segments and are secured together by a pair of explosive bolts 58 which engage apertured trunnions 60 disposed in loops 62 at the ends of the bands.

In the operation of the device, squib 36 is initiated, igniting igniter 34 and the solid propellant, producing thrust as in any conventional solid propellant motor. When powder grain 38 is consumed and combustion chamber pressure decays, this change in pressure is sensed by any suitable means (not shown) which closes a circuit to explosive bolt 58, releasing bands 56. Remaining pressure then forces nozzle 20 rearwardly which forces segments 48 radially outwardly, releasing them from locking engagement with nozzle 20, which is then ejected. Valves 46 then open inwardly, allowing ram air to enter the casing which is mixed with liquid fuel, either before or after entry of the air, the motor thence operating as a ram jet motor with the now enlarged nozzle throat.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In a rocket launched-ram-jet sustained motor having a common combustion chamber with a ram jet nozzle of relative large throat diameter and a rocket nozzle of relatively small throat diameter, the rocket nozzle being sealingly disposed within the ram jet nozzle and adapted to be axially ejected therefrom by combustion chamber pressure at termination of rocket thrust, the motor having means for admitting ram air thereafter, the improvements in combination, comprising;
   a. a circular outwardly extending flange on the rear end of the ram jet nozzle having a circular outwardly and rearwardly tapered surface on its forward side,
   b. a plurality of equi-angularly spaced arcuate segments for preventing ejection of the rocket nozzle,
   c. each segment having a surface conforming to and engaging said tapered surface,
   d. each segment having an inwardly directed flange with a portion thereof in engagement with the rear face of the rocket nozzle for preventing its ejection, and
   e. a band encircling the segments having ends connected by at least one explosive bolt,
   f. the construction and arrangement being such that upon explosive bolt actuation the band releases from the segments and combustion chamber pressure moves the rocket nozzle axially rearwardly, forcing the segments radially outwardly and permitting ejection of the rocket nozzle.

2. Apparatus in accordance with claim 1 wherein each segment extends approximately 90° around the flange, and said band is in two parts, each extending about 180° around the flange, and a pair of diametrically opposed explosive bolts, each connecting adjacent ends of the two bands.

* * * * *